L. A. BUTTS.
SEED PLANTER.
No. 67,409. Patented Aug. 6, 1867.
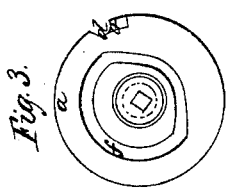
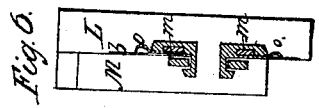
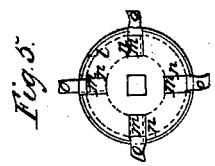
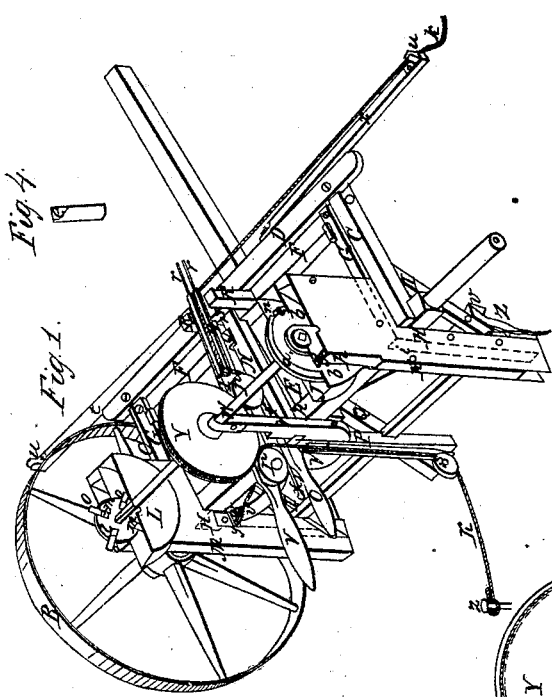
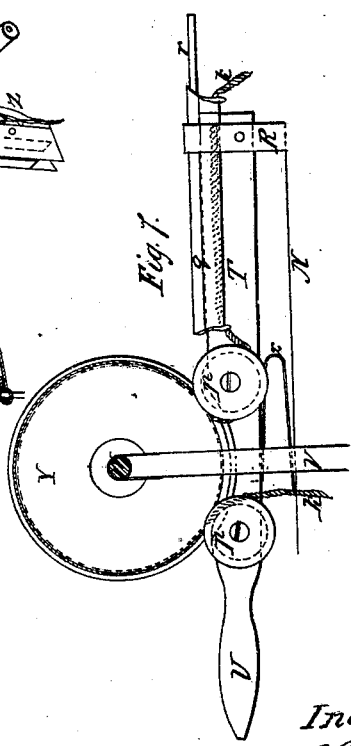
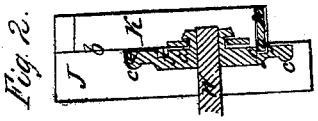
Witnesses
Inventor;
L. A. Butts

United States Patent Office.

L. A. BUTTS, OF RIPON, WISCONSIN.

Letters Patent No. 67,409, dated August 6, 1867.

---

IMPROVEMENT IN SEED-PLANTERS.

---

The Schedule referred to in these Letters Patent and making part of the same.

---

TO ALL WHOM IT MAY CONCERN:

Be it known that I, L. A. BUTTS, of Ripon, county of Fond du Lac, and State of Wisconsin, have invented certain new and useful improvements in Seed-Planters; and I do hereby declare that the following is a full, clear, and exact description of the construction and operation of the same, reference being had to the annexed drawings, making a part of this specification, in which—

Figure 1 is a perspective view of the machine.

Figure 2 is a horizontal section of one of the hoppers and seed-distributers.

Figure 3 is a side view of a seed-distributer.

Figure 4 represents a section of the seed-distributer, vertically through a seed-cup, at right angles to its open side.

Figure 5 represents the reverse side of another seed-distributer, an obvious modification of the first.

Figure 6 represents a horizontal section of the seed-distributer shown in fig. 5 and its hopper.

Figure 7 is a side view of the driving-wheel.

Similar letters of reference indicate corresponding parts in the several figures.

This invention consists in raising the seed to be planted in cups or cells open at the top and on one side, and with a bottom sloping to the open side, which are rotated from above inside the hopper and through the seed therein, with their open sides in contact with a perpendicular plate attached to or forming a part of the hopper until the cups are entirely above the height of the seed in the hopper, when the seed in the cups falls through their open sides, over the top of the plate, through a tube toward the ground, and in operating the seed-distributers by a rope fastened to the ground behind the machine, passed over a driving-wheel thereon, and across the field beyond, so that, as the machine is drawn along, the friction of the rope upon the driving-wheel, to which it is led and held by proper guides and pressure, turns it and the seed-distributers to which it is connected by its horizontal shaft, by this means measuring the space passed over and the distance between the hills so exactly as to enable the operator to plant in check rows.

To enable those skilled in the art to fully understand and construct my invention, I will proceed to describe it.

A represents an axle having a wheel, B, placed loosely at each end, (one being removed to show the parts of the machine fully,) and C C are two bars attached to one side of the axle and projecting from it at right angles, and having a cross-piece, D, parallel with the axle, attached to their outer ends. On the under side of the axle, near the centre, is attached the draught-pole E, attached also to the cross-piece D at its intersection therewith. On the front side of the cross-piece are pivoted the arms $t$, having at their outer ends the guides $u$. The journals of the shaft F pass through the outer ends of the bars C C, and to that shaft, close to the inside of each of those bars is attached an end of a bar, G, its other end passing back over the axle, and having there attached a pendent bar, H, to the lower end of which is fastened an end of a brace, I, having its other end attached to the bar G, near the shaft F. Attached to one of the bars G is a hopper, J, and its conducting-tube K passing down the back side of the pendent bar H and to the other bar G and its pendant, a hopper, L, and its conducting-tube M. Near the centre of the shaft F is attached the bar N, which extends back over the axle, a portion continued beyond being shaped into the handle O, and has attached behind the axle the pendent bar P, and near the shaft F the upper end of the bar Q, its lower end being fastened near the lower end of the pendant P, and having there attached the grooved pulley $s$. On each side the intersecting bar N rises from the shaft F a post, R, the two being joined by the short bar S, upon which, near one of the posts, is pivoted the bar T, which extends back over the axle and is shaped into the handle U, and has attached to one side the two-flanged pulleys $p\ p$, and forward of those the trough-shaped conductor $q$, with guide-pins $r\ r$ projecting in front, and upon its under side a spring, $x$, which rests upon the bar N and presses the bar T upward. On each side the pendent bar P is attached a post, V, which rises parallel to said bar, and has on its top a bearing of the shaft W, upon which, playing between the posts V and between the pulleys $p\ p$, which press against it below, is the flanged driving-wheel Y. One of the squared ends of the shaft W fits loosely in the seed-distributer $a$, which is a metallic disk having one plane side which plays against a perpendicular plate, $b$, forming one side of the hopper J, and has the other side at its edge moulded into a semicircular bead, $c$, through which, to the plane side, is the aperture $d$, in the lower part of which is sunk the seed-cup $e$, open at its top into the aperture $d$, its sides corresponding to the bead $c$, except that toward the plane side of the disk, which is open or wanting, and its bottom sloping to the open side. In the plane side of the disk is sunk the cam-groove $f$, in which plays the pin $g$, in the top of the valve $h$, which is pivoted at $i$ in the tube K. At the other end of the shaft W is shown a seed-distributer, $l$, modified to adapt the machine to planting in drills. It is composed of two circular plates fastened together, holding in a groove between them a rubber band, $m$, and through the edge of one of the plates are slots $n$, in which are inserted, under the band $m$, slips of metal having at their outer ends seed-cups $o$ similar to the cups $e$, so that a greater or less number of cups, or those of a different size, can be used at pleasure. A flat, segment-shaped bar, $v$, having projections $w$ near each end, is attached at its upper end near the top of each pendent bar H, and near its lower end to the brace I, a plough, Z, being attached to its extreme lower end, projecting beyond the brace and to the lower end of the pendant H. Spring-catches $y$, projecting from the under side of the axle, and drawn back by a cord connecting them with the front end of the pin X, which passes loosely through the axle, fit over or under the projections $w$ in each bar $v$, as the working part of the machine, pivoted on the shaft F, rests on the axle or is raised to lift the ploughs from the ground. A rope, $k$, having at either end a pin, $z$, is passed under the pulley $s$, between the rear pulley $p$ and the driving-wheel, over the driving-wheel, between it and front pulley $p$, under that and through the conductor $q$, under one of the guide-pins $r$, and through a guide, $u$, to the ground.

The operation is as follows: The pin $z$ behind the machine is driven into the ground. As the machine is driven along the rope $k$, kept from slipping by the pulleys $p$ $p$, which are pressed upward by the spring $x$ and by the strain of the rope, turns the driving-wheel Y, and, by means of its shaft W, the seed-distributers $a$ and $l$, the seed-cups $e$ and $o$ in which, rotated through the seed in the hoppers, take up what is required for each deposit, the plate $b$ retaining it until the cups pass its top, when the seeds fall through their open sides into the tubes K or M. In the tube M the seed falls immediately to the ground, but in the tube K it is stopped at the bottom by the valve $h$ until, by means of the cam in the groove $f$ and the pin $g$, the valve is opened, when the seed falls into the furrow opened by the plough Z. At the end of the row the rope is thrown off, the machine turned round and placed to start anew, the rope replaced, and the operation repeated.

By these means the seed for each deposit is separated from the mass with certainty and regularity, without danger of failure by clogging, or from too rapid motion, or of crushing the kernels, and in readily variable quantity, and the operation of the machinery is made independent of the varying condition of the soil, roughness of surface, swaying motion, and other circumstances which prevent the correct operation of machines receiving their motion from wheels travelling on the ground, and is made correct and reliable.

I am aware that in various seed-distributing devices cups rotated wholly or in part within the hoppers have been used, and that ropes have been used to give motion to the machinery of seed-planters in a different manner from that described, and I do not claim broadly, without regard to construction or application, either of those means of producing the desired result; but having thus fully described my invention, what I claim as new, and desire to secure by Letters Patent, is—

The hoppers J and L, seed-distributers $a$ and $l$, seed-cups $e$ and $o$, shaft W, driving-wheel Y, pulleys $p$ $p$, conductor $q$, lever U, guide-pins $r$, guides $u$, and rope $k$, in combination with the vertically adjustable frame which carries the seeding devices, all arranged and operating as set forth.

L. A. BUTTS.

Witnesses:
  C. M. COOLEY,
  J. S. DE LANO.